C. P. KEMMERER.
Feed-Regulator for Millstones.
No. 199,371. Patented Jan. 22, 1878.
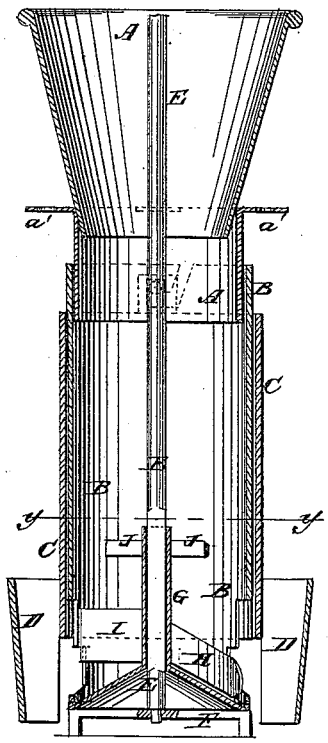
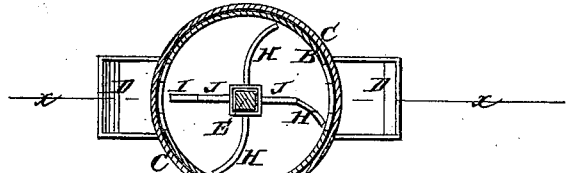
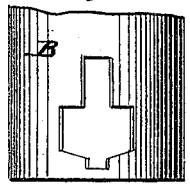
WITNESSES:
INVENTOR:
C. P. Kemmerer.
BY
ATTORNEYS.

UNITED STATES PATENT OFFICE.

CHARLES P. KEMMERER, OF DRUMS, PENNSYLVANIA.

IMPROVEMENT IN FEED-REGULATORS FOR MILLSTONES.

Specification forming part of Letters Patent No. 199,371, dated January 22, 1878; application filed October 12, 1877.

*To all whom it may concern:*

Be it known that I, CHARLES PETER KEMMERER, of Drums, in the county of Luzerne and State of Pennsylvania, have invented a new and useful Improvement in Mill-Feeders, of which the following is a specification:

Figure 1 is a vertical section of my improved feeder, taken through the line $xx$, Fig. 2. Fig. 2 is a cross-section of the same, taken through the line $yy$, Fig. 1. Fig. 3 is a detail view, showing a discharge-opening.

Similar letters of reference indicate corresponding parts.

The object of this invention is to furnish an improved feeder for feeding grain, middlings, chops, crushed corn, &c., to the burrs, bolts, &c., in mills, which shall be simple in construction, effective and reliable in operation, feeding the material regularly and uniformly, and shall not be liable to get out of order.

The invention will first be described in connection with the drawings, and then be pointed out in the claim.

In the drawings, A represents the funnel-shaped upper end of the feeder, that receives the material, and to which are attached lugs $a'$, by which it is secured to a hopper, trestle, or other support. The lower part of the funnel A is made cylindrical in form, and to it is secured, by a bayonet-clutch or other suitable fastening, the upper end of a tube, B, the bottom of which is made conical, and in the opposite sides of its lower end are formed cross-shaped openings, through which the material is forced out. Upon the tube B is placed another tube, C, which may be raised and lowered by a rack or other suitable means, to regulate the size of the discharge-openings of the inner tube B. To the lower part of the tube C, directly opposite the discharge-openings of the tube B, are attached shields or spouts D, to receive the material and allow it to drop to the lower burr, or other desired place. E is a shaft, which passes down through the center of the feeder through a hole in the apex of the conical bottom of the tube B, and its lower end revolves in a support, F. The shaft E is designed to be driven by the power that drives the mill. The lower part of the shaft E, just above the conical bottom of the tube B, is made square, to receive a square sleeve, G, to the lower part of which are attached four wings, three, H, of which are curved back, and are inclined downward to correspond with the conical bottom of the tube B, and the fourth, I, is made straight and wider, to push out any larger grains, white heads, straws, &c. To the upper part of the square sleeve G are attached two short straight wings, J, to keep the grain stirred up and mixed.

Having thus described my invention, I claim as new and desire to secure by Letters Patent—

The combination of the fixed tube B, having conical bottom and cross-shaped apertures near lower end, the sliding tube C, the shield D, and the wings H I, all constructed and arranged substantially as and for the purpose specified.

CHARLES P. KEMMERER.

Witnesses:
 JNO. J. HUMPHREYS,
 WM. McKEE.